(12) United States Patent　(10) Patent No.:　US 12,683,222 B2

Ariga　(45) Date of Patent:　Jul. 14, 2026

---

(54) BATTERY MODULE

(71) Applicant: HONDA MOTOR CO., LTD., Tokyo (JP)

(72) Inventor: Toshiyuki Ariga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 690 days.

(21) Appl. No.: 18/179,388

(22) Filed: Mar. 7, 2023

(65) Prior Publication Data

US 2023/0318103 A1　Oct. 5, 2023

(30) Foreign Application Priority Data

Mar. 29, 2022　(JP) ................................. 2022-054605

(51) Int. Cl.
| | |
|---|---|
| *H01M 50/207* | (2021.01) |
| *H01M 4/66* | (2006.01) |
| *H01M 10/04* | (2006.01) |
| *H01M 50/152* | (2021.01) |
| *H01M 4/02* | (2006.01) |

(52) U.S. Cl.
CPC ......... *H01M 50/207* (2021.01); *H01M 4/666* (2013.01); *H01M 10/0422* (2013.01); *H01M 10/0431* (2013.01); *H01M 50/152* (2021.01); *H01M 2004/027* (2013.01); *H01M 2004/028* (2013.01)

(58) Field of Classification Search
CPC .. H01M 50/207; H01M 50/122; H01M 50/15; H01M 4/666
See application file for complete search history.

(56) References Cited

U.S. PATENT DOCUMENTS

| | | | | |
|---|---|---|---|---|
| 5,310,609 | A * | 5/1994 | Earl | ...................... H01M 50/54 429/185 |
| 6,022,642 | A | 2/2000 | Tsukamoto et al. | |
| 2009/0142669 | A1* | 6/2009 | Shinohara | ......... H01M 10/0562 65/45 |
| 2009/0155680 | A1* | 6/2009 | Maguire | ............. H01M 10/643 429/158 |

(Continued)

FOREIGN PATENT DOCUMENTS

| | | |
|---|---|---|
| JP | S60249264 A | 12/1985 |
| JP | H10189050 A | 7/1998 |
| JP | H11339761 A | 12/1999 |

(Continued)

OTHER PUBLICATIONS

Machine Translation of: JP 11-339761, Kobayashi, Dec. 10, 1999.*
Notification of Reasons for Refusal issued Nov. 4, 2025 in the JP Patent Application No. 2022-054605.

*Primary Examiner* — Kenneth J Douyette
(74) *Attorney, Agent, or Firm* — CKC & Partners Co., LLC

(57)　ABSTRACT

Provided is a battery module including: multiple cylindrical batteries each including: a shaft core; a set of wound electrodes including an electrode stack wound around the shaft core and including a positive electrode, a negative electrode, and an electrolyte provided between the positive and negative electrodes stacked; a first fastener provided at a first axial end of the shaft core; and a second fastener provided at a second axial end of the shaft core, adjacent ones of the cylindrical batteries being fastened together with the first and second fasteners.

11 Claims, 8 Drawing Sheets

(56)                 References Cited

U.S. PATENT DOCUMENTS

2012/0040238  A1      2/2012   Wu

FOREIGN PATENT DOCUMENTS

| JP | 2001135358 | A | 5/2001 |
| JP | 2008016411 | A | 1/2008 |
| JP | 2009016188 | A | 1/2009 |
| JP | 2019106376 | A | 6/2019 |
| JP | 2022025413 | A | 2/2022 |

* cited by examiner

100

10

80

80

BATTERY MODULE

This application is based on and claims the benefit of priority from Japanese Patent Application No. 2022-054605, filed on 29 Mar. 2022, the content of which is incorporated herein by reference.

BACKGROUND OF THE INVENTION

Field of the Invention

The present invention relates to a battery module.

Related Art

In recent years, secondary batteries that contribute to energy efficiency have been researched and developed to ensure that more people have access to affordable, reliable, sustainable, and advanced energy.

Patent Document 1 discloses an assembled battery for use in vehicles, including: multiple cylindrical batteries each including a case and positive and negative electrode terminals each having a threaded surface, the positive and negative electrode terminals being provided at central portions of two end walls of the case; and a connection member that have two end portions individually screwed in or on the positive and negative electrode terminals of a pair of the cylindrical batteries adjacent to each other to join the pair of cylindrical batteries electrically and mechanically.

Patent Document 1: Japanese Unexamined Patent Application, Publication No. H11-339761

SUMMARY OF THE INVENTION

Unfortunately, such an assembled battery for use in vehicles has a relatively large dead space, and there is a need to increase its volumetric energy density.

It is an object of the present invention to provide a battery module with increased volumetric energy density.

An aspect of the present invention is directed to a battery module including: multiple cylindrical batteries each including: a shaft core; a set of wound electrodes including an electrode stack wound around the shaft core and including a positive electrode, a negative electrode, and an electrolyte provided between the positive and negative electrodes stacked; a first fastener provided at a first axial end of the shaft core; and a second fastener provided at a second axial end of the shaft core, adjacent ones of the cylindrical batteries being fastened together with the first and second fasteners.

One of the first and second fasteners may be an external thread, the other of the first and second fasteners may be an internal thread, and the external thread and the shaft core may be parts of a single piece.

The first fastener may be electrically connected to one of the positive and negative electrodes, and the second fastener may be electrically connected to the other of the positive and negative electrodes.

The cylindrical batteries may each further include an exterior member surrounding the set of wound electrodes.

The cylindrical batteries may each further include: a first cap disposed at the first axial end and electrically connected to one of the positive and negative electrodes; and a second cap disposed at the second axial end and electrically connected to the other of the positive and negative electrodes. The first and second caps may each have a slope region that is substantially symmetrically inclined with respect to the shaft core. The positive electrode may include a positive electrode current collector, and the negative electrode may include a negative electrode current collector. The positive electrode current collector may have an extension portion extending from a first axial end of the set of wound electrodes, and the negative electrode current collector may have an extension portion extending from a second axial end of the set of wound electrodes. The extension portion of one of the positive and negative electrode current collectors may have parts gathered and electrically connected to the shaft core, and the extension portion of the other of the positive and negative electrode current collectors may have parts gathered and electrically connected to the exterior member.

The slope region of one of the first and second caps that is electrically connected to the extension portion electrically connected to the exterior member may be inclined at a larger angle than the slope region of the other of the first and second caps that is electrically connected to the extension portion electrically connected to the shaft core.

The first and second caps may each have a conical shape.

The first cap may be electrically connected to one of the positive and negative electrode current collectors, and the second cap may be electrically connected to the other of the positive and negative electrode current collectors.

The extension portion of one of the positive and negative electrode current collectors may be at least partially not surrounded by the exterior member, and the extension portion of the other of the positive and negative electrode current collectors may be surrounded by the exterior member.

The cylindrical batteries may each be a solid-state battery.

The electrode stack may include a solid electrolyte layer provided between the positive and negative electrodes stacked.

The present invention provides a battery module with increased volumetric energy density.

DETAILED DESCRIPTION OF THE INVENTION

Hereinafter, embodiments of the present invention will be described with reference to the drawings.

Figure 1:
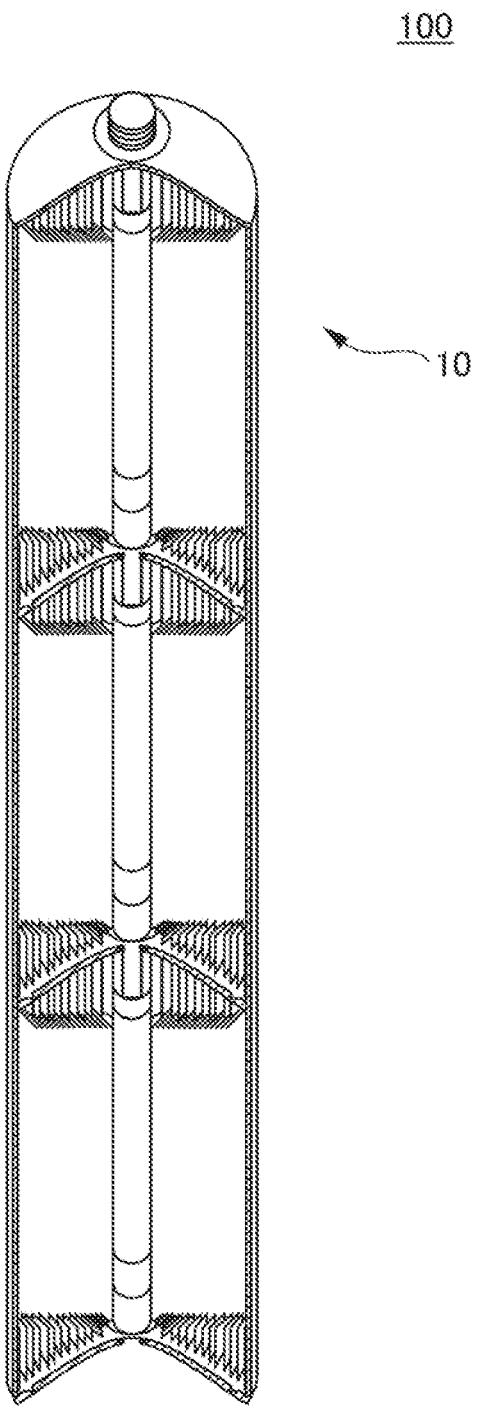
FIG. 1 is a partially cut-out, cross-sectional, perspective view of a battery module according to an embodiment of the present invention.
Figure 2:
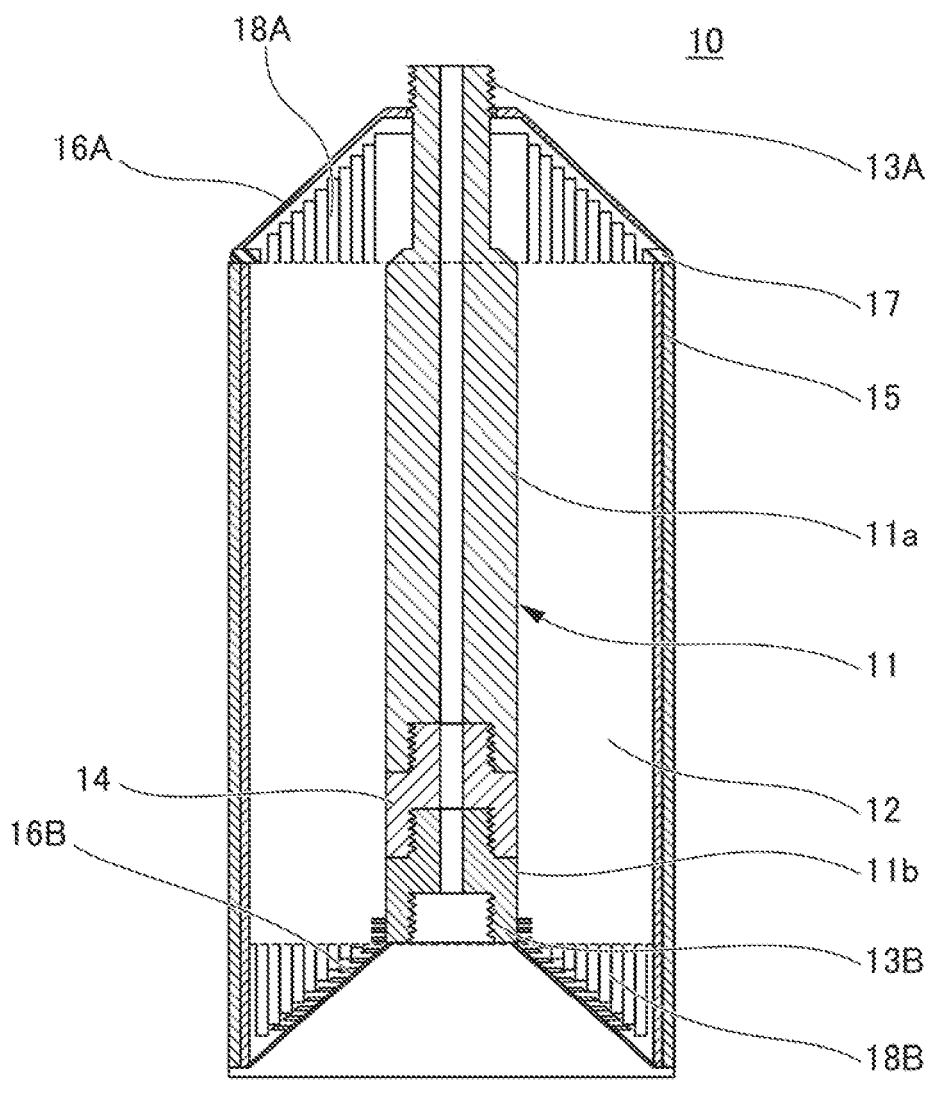
FIG. 2 is a cross-sectional view of the cylindrical battery shown in FIG. 1.

FIG. 1 shows an example of a battery module according to an embodiment of the present invention. FIG. 2 shows the cylindrical battery shown in FIG. 1.

The battery module 100 includes multiple cylindrical batteries 10. The cylindrical batteries 10 each include: a shaft core 11; a set 12 of wound electrodes; an external thread 13A, which is a first fastener; and an internal thread 13B, which is a second fastener. The set 12 of wound electrodes includes an electrode stack including: a positive electrode, a negative electrode, and an electrolyte provided between the positive and negative electrodes stacked. The electrode stack is wound around the shaft core 11. The external thread 13A is provided at a first axial end (upper end) of the shaft core 11. The internal thread 13B is provided at a second axial end (lower end) of the shaft core 11. In the battery module 100, the cylindrical batteries 10 adjacent to each other are joined together with the external and internal threads 13A and 13B. This configuration allows the battery module 100 to have a smaller dead space and thus to have a higher volumetric energy density.

In this embodiment, the external thread 13A and the shaft core 11 are parts of a single piece. This feature provides a higher strength against the rotational torque for tightening the external thread 13A into the internal thread 13B. The external thread 13A is electrically connected to one of the positive and negative electrodes, and the internal thread 13B is electrically connected to the other of the positive and negative electrodes.

Alternatively, the external thread 13A and the shaft core 11 may not be parts of a single piece. Moreover, the first fastener may be an internal thread, and the second fastener may be an external thread.

The shaft core 11 includes a first electrically-conductive part 11a, an insulating part 14, and a second electrically-conductive part 11b, which are arranged in the axial direction. The insulating part 14 is disposed between the first and second electrically-conductive parts 11a and 11b and joined to the first and second electrically-conductive parts 11a and 11b. This feature allows an insulating member 17 to be compressed as described later and thus increases the sealing of the cylindrical battery 10. The internal thread is provided at the axial lower end of the first electrically-conductive part 11a. The insulating part 14 has an axial upper end, above which the external thread is provided, and has an axial lower end, below which the internal thread is provided. The external thread is provided at the axial upper end of the second electrically-conductive part 11b.

The first and second electrically-conductive parts 11a and 11b may be made of any suitable material, such as metal. The insulating part 14 may be made of any suitable material, such as polypropylene (PP), polyethylene (PE), polyethylene terephthalate (PET), polyphenylene sulfide (PPS), polytetrafluoroethylene (PTFE), PFA, or any other resin.

The electrode stack is in the form of a sheet, which includes electrodes each including an electrode current collector and an electrode material mixture layer provided on the electrode current collector. Specifically, the positive electrode includes a positive electrode current collector and a positive electrode material mixture layer provided on the current collector, and the negative electrode includes a negative electrode current collector and a negative electrode material mixture layer provided on the current collector. The electrolyte may be any type. For example, the electrolyte may be contained in an electrolytic solution with which a common porous resin membrane (separator) is impregnated. The cylindrical battery 10 may be a solid-state battery. In this case, the electrolyte may be contained in a gel electrolyte layer, a solid electrolyte layer, or any other solid-state layer.

The electrode stack may have any stacked structure including a positive electrode, a negative electrode, and an electrolyte provided between the positive and negative electrodes. The electrode stack may include multiple positive electrodes and/or multiple negative electrodes. The stacked structure of the electrode stack including multiple positive electrodes and/or multiple negative electrodes may include, for example, a positive electrode, an electrolyte, a negative electrode, an electrolyte, and a positive electrode, which are stacked in order. The electrode stack may be produced, for example, by a roll pressing process.

The cylindrical battery 10 further includes an exterior member 15 surrounding the set 12 of wound electrodes. In this embodiment, the exterior member 15 is in the form of a sheet. The exterior member 15 may be made of any electrically-conductive material, such as metal.

In this embodiment, the exterior member 15 may be bonded with an adhesive to a distal end of the set 12 of wound electrodes, the distal end not being in contact with the shaft core 11, or the exterior member 15 may be an electrode current collector extending from a distal end of the set 12 of wound electrodes, the distal end not being in contact with the shaft core 11. In this structure, there is no clearance between the shaft core 11 and the set 12 of wound electrodes or between the set 12 of wound electrodes and the exterior member 15, and they are mechanically integrated to provide an increased volumetric energy density for the battery module 100. Moreover, the shaft core 11, the set 12 of wound electrodes, and the exterior member 15, mechanically integrated together, maintain sufficient strength against the rotational torque applied when the external thread 13A is tightened into the internal thread 13B while the exterior member 15 is gripped.

The set 12 of wound electrodes, surrounded by the exterior member 15, may be obtained by a process including winding the electrode stack and the exterior member 15 on the shaft core 11 while applying a certain tension to the electrode stack and the exterior member 15. In this process, pressure may be applied to the outside of the shaft core 11 while the electrode stack and the exterior member 15 are wound around the shaft core 11.

The cylindrical battery 10 further includes a first cap 16A and a second cap 16B. The first cap 16A is disposed at a first axial end (upper end) and electrically connected to one of the positive and negative electrodes. The second cap 16B is disposed at a second axial end (lower end) and electrically connected to the other of the positive and negative electrodes. In this embodiment, the first and second caps 16A and 16B each have a conical shape and a slope region that is substantially symmetrically inclined with respect to the shaft core 11. A ring-shaped insulating member 17 is disposed between the exterior member 15 and the first cap 16A. The first cap 16A is electrically connected to the external thread 13A, and the second cap 16B is electrically connected to the internal thread 13B and the exterior member 15.

The slope region of each of the first and second caps 16A and 16B may be inclined at any angle with respect to the shaft core 11. The angle at which the slope region of the first cap 16A is inclined with respect to the shaft core 11 is determined by the height of a proximal part of an extension portion 18A of the set 12 of wound electrodes and the width determined by the number of turns of the set 12 of wound electrodes, in which the proximal part of the extension portion 18A is adjacent to the shaft core 11. The slope region of the first cap 16A has a volume large enough to accommodate the extension portion 18A.

The first and second caps 16A and 16B may be made of any electrically-conductive material, such as metal. The first and second caps 16A and 16B may be made of the same material or different materials.

The insulating member 17 is compressed by the force exerted when the external thread 13A at the axial upper end of a shaft core 11 is tightened into the internal thread 13B at the axial lower end of another shaft core 11, so that the exterior member 15 and the first cap 16A are fixed and sealed. The second cap 16B and the exterior member 15 are joined at their contact portions by laser welding, so that they are integrated and sealed.

The insulating member 17 may be made of any suitable material, such as polypropylene (PP), polyethylene (PE), polyethylene terephthalate (PET), polyphenylene sulfide (PPS), polytetrafluoroethylene (PTFE), PFA, or any other resin.

The positive electrode current collector has an extension portion 18A extending from a first axial end (upper end) of the set 12 of wound electrodes. The negative electrode current collector has an extension portion 18B extending from a second axial end (lower end) of the set 12 of wound electrodes. In this embodiment, the extension portion 18A of the positive electrode current collector is electrically connected to the first cap 16A, and the extension portion 18B of the negative electrode current collector is electrically connected to the second cap 16B.

In this embodiment, the slope region of the second cap 16B electrically connected to the extension portion 18B for current collection to the exterior member 15 is inclined at a larger angle than the slope region of the first cap 16A electrically connected to the extension portion 18A for current collection to the shaft core 11. Thanks to this feature, adjacent cylindrical batteries 10 are easily joined together with the external and internal threads 13A and 13B.

Figure 3:
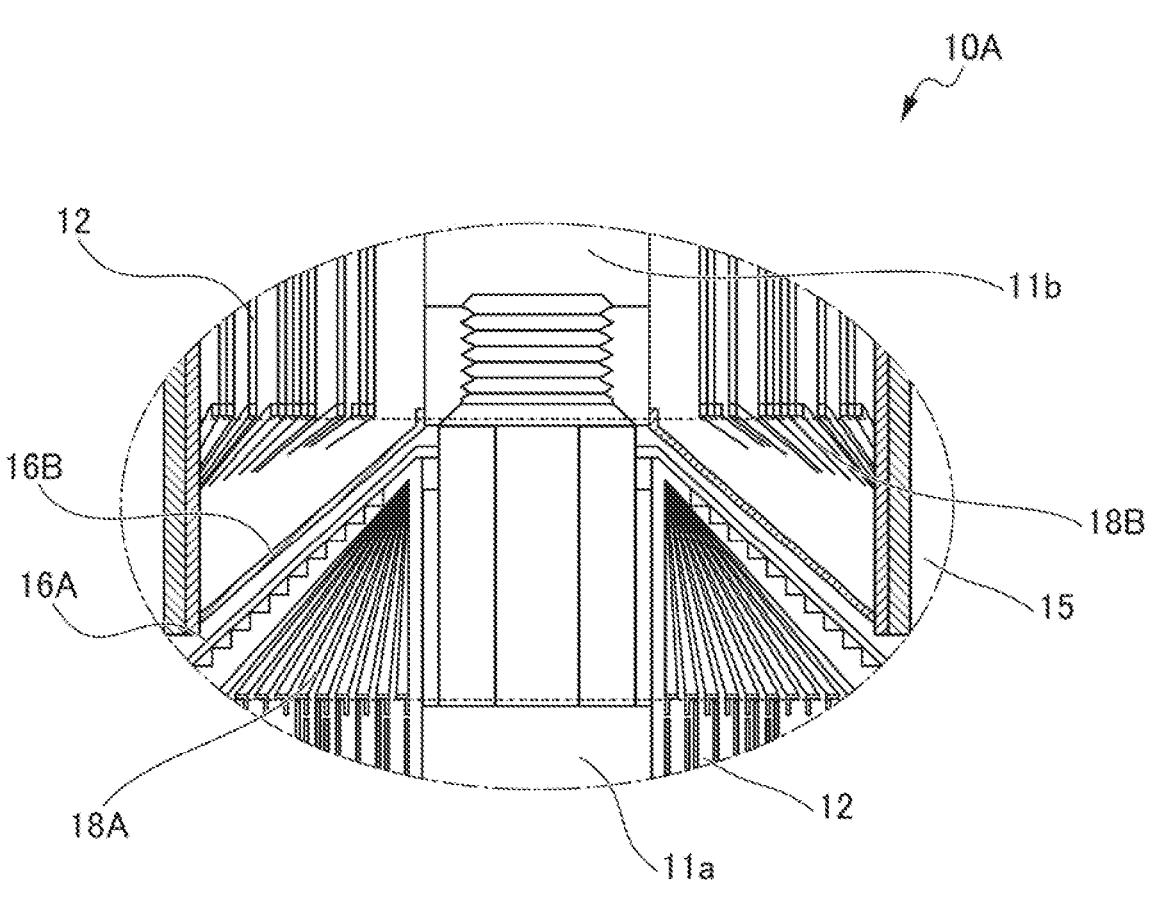
FIG. 3 is a partially enlarged, cross-sectional view of a preferred mode of the battery module shown in FIG. 1.

FIG. 3 shows a preferred mode of the battery module 100.

Referring to FIG. 3, the cylindrical battery 10A is similar to the cylindrical battery 10, except that the extension portion 18A of the positive electrode current collector has parts gathered and electrically connected to the shaft core 11 and that the extension portion 18B of the negative electrode current collector has parts gathered and electrically connected to the exterior member 15. Also in this case, the first cap 16A is electrically connected to the positive electrode current collector, and the second cap 16B is electrically connected to the negative electrode current collector.

Figure 4:
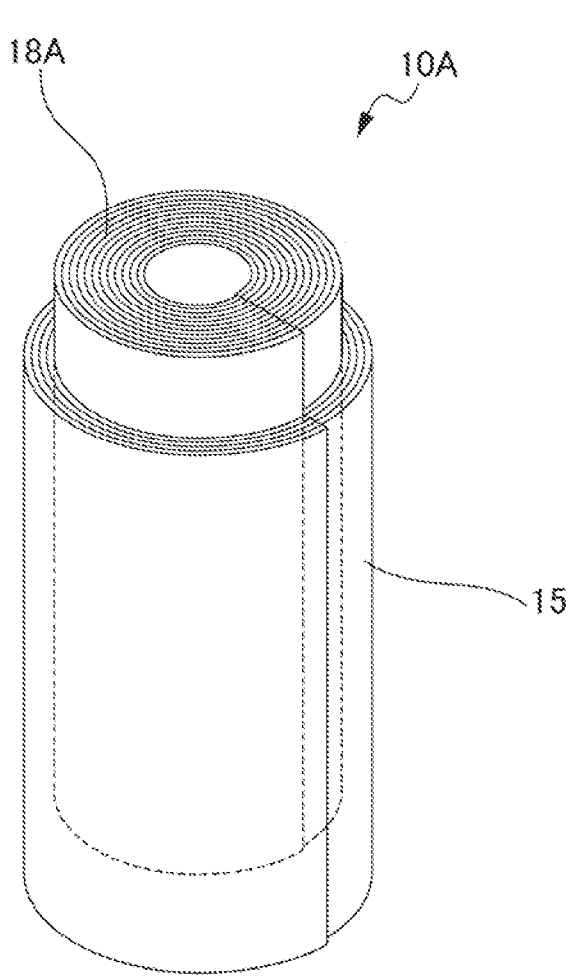
FIG. 4 is a perspective view of a modification of the cylindrical battery shown in FIG. 3.

As shown in FIG. 4, in the cylindrical battery 10A, the extension portion 18A of the positive electrode current collector is not surrounded by the exterior member 15, while the extension portion 18B of the negative electrode current collector is surrounded by the exterior member 15. It should be noted that FIG. 4 shows the cylindrical battery 10A provided before it is sealed with the first and second caps 16A and 16B.

Hereinafter, an example will be described in which the battery module according to an embodiment of the present invention includes cylindrical, all-solid-state, lithium secondary batteries.

The positive electrode current collector may be any suitable type, such as an aluminum foil.

The positive electrode material mixture layer includes a positive electrode active material and may further include a solid electrolyte, a conductive aid, a binder, and other optional materials.

The positive electrode active material may be any suitable material capable of storing and releasing lithium ions, examples of which include $LiCoO_2$, $Li(Ni_{5/10}Co_{2/10}Mn_{3/10})$ $O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, and sulfur.

The solid electrolyte, which constitutes a solid electrolyte layer, may be any suitable material capable of conducting lithium ions, such as an oxide-based electrolyte, a sulfide-based electrolyte, or a molecular crystal electrolyte including crystals of an organic material with a dissociated electrolyte.

The negative electrode material mixture layer includes a negative electrode active material and may further include a solid electrolyte, a conductive aid, a binder, and other optional materials.

The negative electrode active material may be any suitable material capable of storing and releasing lithium ions, examples of which include metallic lithium, lithium alloys, metal oxides, metal sulfides, metal nitrides, Si, SiO, and carbon materials. Examples of the carbon materials include artificial graphite, natural graphite, hard carbon, and soft carbon.

The negative electrode current collector may be any suitable type, such as a copper foil.

Next, a method for producing the cylindrical battery will be described.

Figure 5:
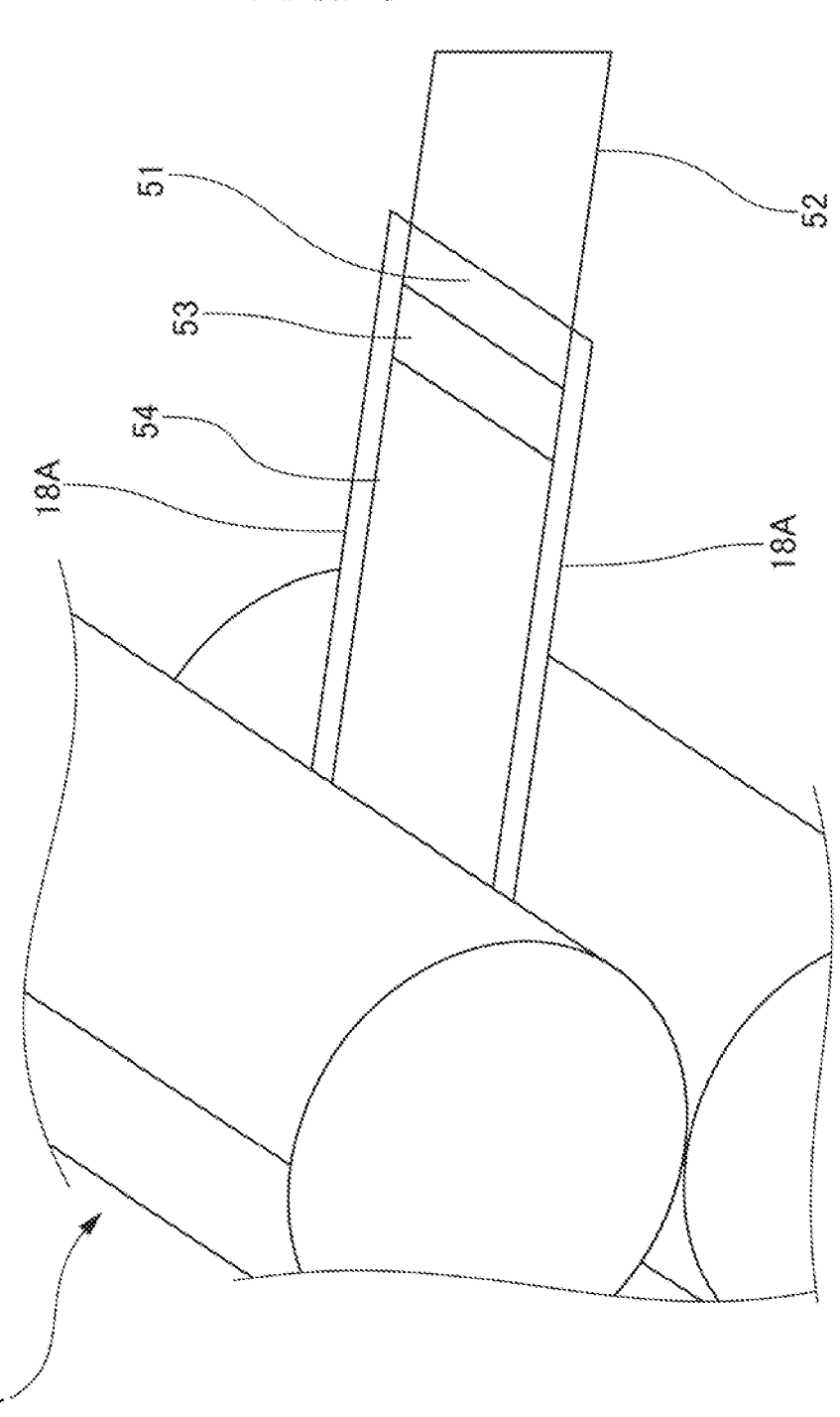
FIG. 5 is a perspective view of a process for forming a stack of a solid electrolyte layer and an electrode.

FIG. 5 shows a process for forming a stack of a solid electrolyte layer and an electrode. While FIG. 5 shows a process for forming a stack of a solid electrolyte layer and a positive electrode, a stack of a solid electrolyte layer and a negative electrode may be formed by a similar process.

First, a resin sheet 52 is attached to one surface of a positive electrode current collector 51 with a part of the surface remaining unattached to the resin sheet 52. At least such a part of the surface will form an extension portion 18A. Next, a positive electrode material mixture layer 53 and a solid electrolyte layer 54 are formed in order on the other surface of the positive electrode current collector 51 with a part of the other surface remaining exposed (not covered with the positive electrode material mixture layer 53 and the solid electrolyte layer 54). Such a part of the other surface will also form an extension portion 18A. Subsequently, the resulting stack is compressed between press rolls P. In this process, the resin sheet 52 attached prevents the positive electrode current collector 51 from breaking under the linear pressure for the compression. The compressed product is then cut at the transverse center into halves, each providing a stack of a positive electrode and a solid electrolyte layer, which has the extension portion 18A on one side.

The stack of a positive electrode and a solid electrolyte layer and the stack of a negative electrode and a solid electrolyte layer are wound around a shaft core 11 with the extension portions 18A and 18B extending away from each other to form a set 12 of wound electrodes. Next, an exterior member 15 is wrapped around the set 12 of wound electrodes to form a cylindrical battery.

Figure 6A:
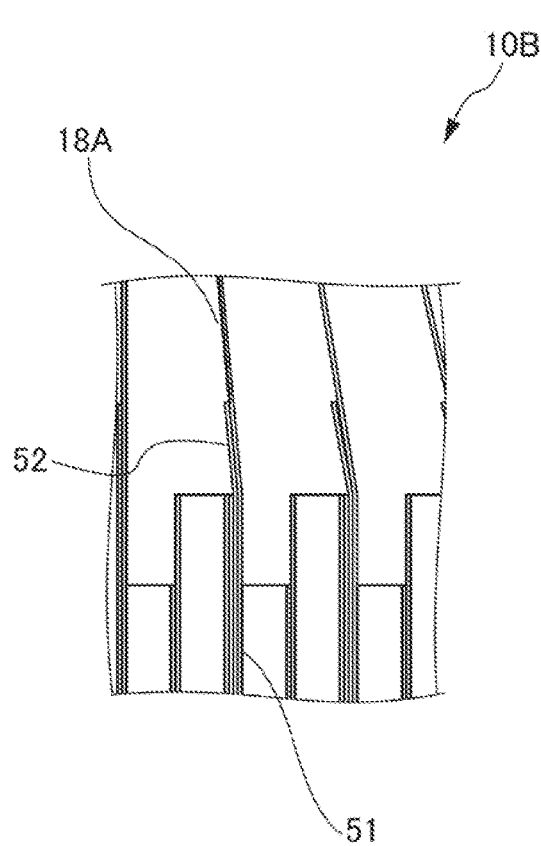
FIGS. 6A and 6B are views of an example of the cylindrical battery obtained through the process shown in FIG. 5.
Figure 6B:
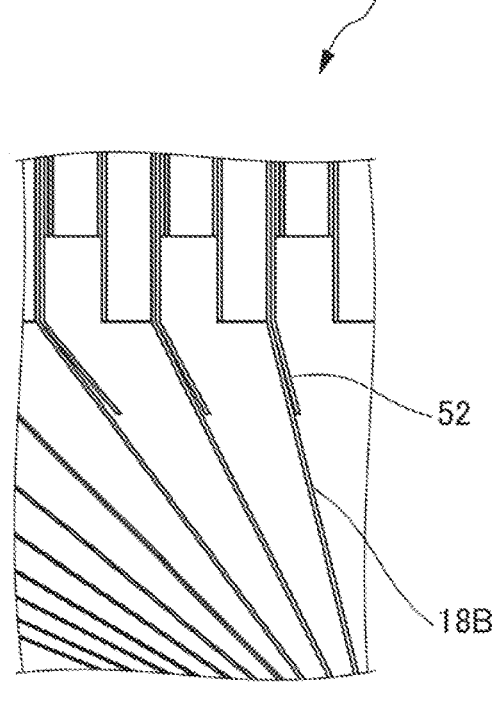

FIGS. 6A and 6B show an example of the cylindrical battery obtained through the process shown in FIG. 5.

Like the cylindrical battery 10A, the cylindrical battery 10B shown in FIGS. 6A and 6B has parts of the extension portion 18A of the positive electrode current collector gathered and electrically connected to the shaft core 11 (see FIG. 6A) and has parts of the extension portion 18B of the negative electrode current collector gathered and electrically connected to the exterior member 15 (see FIG. 6B). In this structure, the resin sheet 52 is also attached to a part of the extension portion 18A to ensure the insulation between the extension portion 18A and the negative electrode. Similarly, the resin sheet 52 is also attached to a part of the extension portion 18B to ensure the insulation between the extension portion 18B and the positive electrode. In conventional lithium-ion secondary batteries, such insulation is ensured by extension of a separator. In the all-solid-state lithium secondary battery, which has no separator, such insulation is also ensured as shown above.

The resin sheet 52 may be made of any suitable insulating material, such as polyethylene (PE), polypropylene (PP), polyethylene terephthalate (PET), polyphenylene sulfide (PPS), or polyamide.

The resin sheet 52 may also be a porous sheet. Moreover, the thickness of the resin sheet 52 may be selected taking into account the amount of compression for allowing absorption of the expansion of the negative electrode, which is effective, for example, in absorbing the expansion of graphite, SiO, or other materials.

Figure 7:
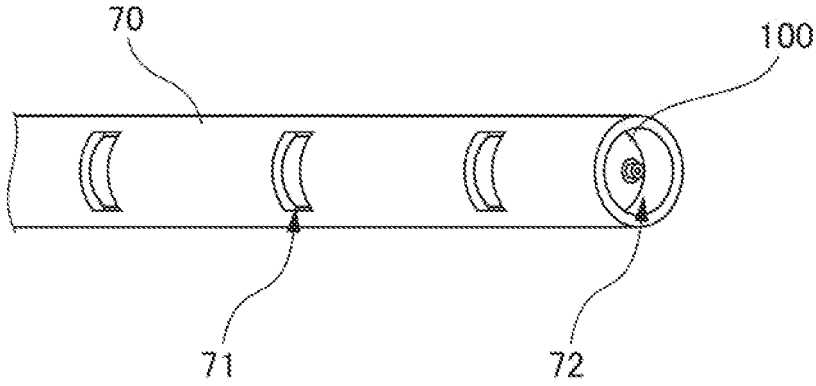
FIG. 7 is a perspective view of an example of a case that accommodates the battery module shown in FIG. 1.
Figures 8A, 8B:
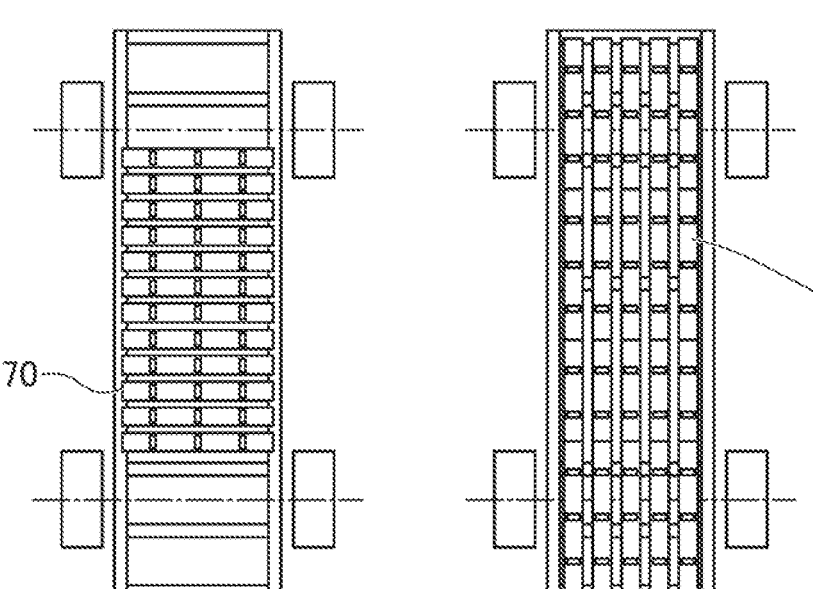
FIGS. 8A and 8B are schematic diagrams showing examples of a vehicle equipped with a battery module 100 accommodated in the case shown in FIG. 7.

FIG. 7 shows an example of a case used to accommodate the battery module 100. FIGS. 8A and 8B show examples of a vehicle equipped with the battery module 100 accommodated in the case shown in FIG. 7.

When used to accommodate the battery module 100 having multiple cylindrical batteries 10 joined together, a case 70 provides, to the battery module 100, rigidity against bending stress. Thus, the battery module 100 accommodated in the case 70 is expected to function as a beam for a vehicle 80. In this regard, the battery module 100 accommodated in the case 70 may be oriented in a direction perpendicular to the direction of travel of the vehicle 80 (see FIG. 8A) or in a direction parallel to the direction of travel of the vehicle 80 (see FIG. 8B). In this embodiment, the case 70 has through holes 71 in the cylindrical body. The through holes 71 are provided for connection of voltage detection wires, thermistors, and other components and thus make it easy to install BMS (battery management system). The case 70 also has through holes 72 at the top and bottom. The through holes 72 are provided for connection of current wires.

The embodiments of the present invention described above are not intended to limit the present invention and may be altered or modified as appropriate without departing from the gist of the present invention.

EXPLANATION OF REFERENCE NUMERALS

10, 10A, 10B: Cylindrical battery
11: Shaft core
11a: First electrically-conductive part
11b: Second electrically-conductive part
12: A set of wound electrodes
13A: External thread
13B: Internal thread
14, 17: Insulating part or member
15: Exterior member
16A: First cap
16B: Second cap
18A, 18B: Extension portion
51: Positive electrode current collector
52: Resin sheet
53: Positive electrode material mixture layer
54: Solid electrolyte layer
70: Case
71, 72: Through hole
80: Vehicle
100: Battery module

What is claimed is:

1. A battery module comprising: a plurality of cylindrical batteries each comprising:
   a shaft core; a set of wound electrodes comprising an electrode stack wound around the shaft core and comprising a positive electrode, a negative electrode, and an electrolyte provided between the positive and negative electrodes stacked; a first fastener provided at a first axial end of the shaft core; a second fastener provided at a second axial end of the shaft core; and an exterior member surrounding the set of wound electrodes,
   adjacent ones of the cylindrical batteries being fastened together with the first and second fasteners,
   wherein the cylindrical batteries each further comprise: a first cap disposed at the first axial end and electrically connected to one of the positive and negative electrodes; and a second cap disposed at the second axial end and electrically connected to another of the positive and negative electrodes,
   wherein the first and second caps each have a slope region that is substantially symmetrically inclined with respect to the shaft core,
   wherein the positive electrode includes a positive electrode current collector, and the negative electrode includes a negative electrode current collector,
   wherein the positive electrode current collector has an extension portion extending from a first axial end of the set of wound electrodes,
   wherein the negative electrode current collector has an extension portion extending from a second axial end of the set of wound electrodes,
   wherein the extension portion of one of the positive and negative electrode current collectors has parts gathered and electrically connected to the shaft core, and
   wherein the extension portion of another of the positive and negative electrode current collectors has parts gathered and electrically connected to the exterior member.

2. The battery module according to claim 1,
   wherein one of the first and second fasteners is an external thread,
   wherein another of the first and second fasteners is an internal thread, and
   wherein the external thread and the shaft core are parts of a single piece.

3. The battery module according to claim 2,
   wherein the first fastener is electrically connected to one of the positive and negative electrodes, and
   wherein the second fastener is electrically connected to another of the positive and negative electrodes.

4. The battery module according to claim 1, wherein the slope region of one of the first and second caps that is electrically connected to the extension portion electrically connected to the exterior member is inclined at a larger angle than the slope region of another of the first and second caps that is electrically connected to the extension portion electrically connected to the shaft core.

5. The battery module according to claim 1, wherein the first and second caps each have a conical shape.

6. The battery module according to claim 1,
   wherein the first cap is electrically connected to one of the positive and negative electrode current collectors, and
   wherein the second cap is electrically connected to another of the positive and negative electrode current collectors.

7. The battery module according to claim 1, wherein the extension portion of one of the positive and negative electrode current collectors is at least partially not surrounded by the exterior member, and wherein the extension portion of another of the positive and negative electrode current collectors is surrounded by the exterior member.

8. The battery module according to claim 1, wherein the positive electrode includes a resin sheet and a positive electrode material mixture layer, the resin sheet is at least attached to a part of one surface of the positive electrode current collector, the part of one surface does not form the extension portion, the positive electrode material mixture layer is provided on a part of another surface of the positive electrode current collector, and the part of another surface does not form the extension portion, and wherein the negative electrode includes a resin sheet and a negative electrode material mixture layer, the resin sheet is at least attached to a part of one surface of the negative electrode current collector, the part of one surface does not form the extension portion, the negative electrode material mixture layer is provided on a part of another surface of the negative electrode current collector, and the part of another surface does not form the extension portion.

9. The battery module according to claim 8, wherein the resin sheet is also attached to a part of the extension portion of the one surface of the positive electrode current collector, and wherein the resin sheet is also attached to a part of the extension portion of the one surface of the negative electrode current collector.

10. The battery module according to claim 1, wherein the cylindrical batteries are each a solid-state battery.

11. The battery module according to claim 10, wherein the electrode stack includes a solid electrolyte layer provided between the positive and negative electrodes stacked.

\* \* \* \* \*